United States Patent
Hintermeister et al.

(10) Patent No.: US 9,268,612 B2
(45) Date of Patent: Feb. 23, 2016

(54) DEPLOYMENT OF MOBILE WORKLOADS BASED ON PROXIMITY

(75) Inventors: Gregory R. Hintermeister, Rochester, MN (US); Nicholas F. Campion, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 772 days.

(21) Appl. No.: 13/435,267

(22) Filed: Mar. 30, 2012

(65) Prior Publication Data

US 2013/0262644 A1 Oct. 3, 2013

(51) Int. Cl.
  *G06F 15/173* (2006.01)
  *G06F 9/50* (2006.01)
(52) U.S. Cl.
  CPC ........ *G06F 9/5027* (2013.01); *G06F 2209/502* (2013.01); *G06F 2209/509* (2013.01)
(58) Field of Classification Search
  USPC ........................................ 709/223, 224, 225
  See application file for complete search history.

(56) References Cited

U.S. PATENT DOCUMENTS

2012/0324259 A1* 12/2012 Aasheim et al. ............. 713/320
2013/0198319 A1* 8/2013 Shen et al. .................... 709/217

OTHER PUBLICATIONS

Palmer et al., "Ibis for Mobility: Solving Challenges of Mobile Computing using Grid Techniques," Proceedings of the 10th workshop on Mobile Computing Systems and Applications, Feb. 23-24, 2009.

E. E. Marinelli, "Hyrax: Cloud Computing on Mobile Devices using MapReduce," Thesis Submitted at the Carnegie Mellon University, Sep. 2009.
Khalaj et al., "The Proxy-Based Mobile Grid," Individual Book Chapter from Mobile Wireless Middleware, Operating Systems, and Applications, pp. 59-69, 2010.
Khalaj et al., "The Proxy-Based Mobile Grid," Presentation from Mobileware Conference 2010, Jul. 1, 2010.
Chu et al., "Mobile OGSI.NET: Grid Computing on Mobile Devices," Proceedings of the 5th IEEE/ACM International Workshop in Grid Computing, Nov. 8, 2004.
Liang et al., "Design of a Dynamic Distributed Mobile Computing Environment," 2007 International Conference on Parallel and Distributed Systems, Dec. 15, 2007.
Liu et al., "An Optimized Solution for Mobile Environment Using Mobile Cloud Computing," 5th International Conference on Wireless Communications, Networking and Mobile Computing, Sep. 24-26, 2009.
Rider, Lynne K., "Self-Healing Minefield", Advanced Vehicle Maneuver Denial System.

* cited by examiner

*Primary Examiner* — Vivek Srivastava
*Assistant Examiner* — Normin Abedin
(74) *Attorney, Agent, or Firm* — Martin & Associates, LLC; Derek P. Martin

(57) ABSTRACT

A mobile workload deployment mechanism in a cloud computing environment determines when mobile devices are in proximity of a resource needed to process a mobile workload, and deploys the mobile workload to the mobile devices in proximity of the needed resource. Various methods performed by the mobile workload deployment mechanism account for the mobile nature of mobile devices, and how that mobility may affect the relocation, suspension, and other processing of the mobile workload.

16 Claims, 5 Drawing Sheets

DEPLOYMENT OF MOBILE WORKLOADS BASED ON PROXIMITY

BACKGROUND

1. Technical Field

This disclosure generally relates to mobile devices, and more specifically relates to using mobile devices in a cloud computing environment and deploying mobile workloads to the devices based on proximity of a resource.

2. Background Art

Cloud computing has become an area of emphasis for software and website providers. Cloud computing is a general term for presenting computation, software, data access, and storage services in a manner that the end-user has no knowledge of the physical location and configuration of the system that delivers the services. With the proliferation of mobile devices, it has been recognized in the prior art that mobile devices may exchange data with devices in the cloud. However, nothing in the prior art shows using mobile devices as compute elements in the cloud.

The mobile nature of mobile devices presents a unique challenge to incorporating mobile devices as compute members in the cloud, because movement of a mobile device may affect the ability of the mobile device to complete a task. For example, if an employee's mobile phone is used to run a task that requires access to the company's network, and if the employee then leaves for lunch, taking his or her mobile phone away from the company's network, the task will not complete. Thus, the unique nature of mobile devices requires deployment of workloads to mobile devices in ways not known in the prior art that account for the movement of mobile devices so the mobile devices can participate as compute members in a cloud computing environment.

BRIEF SUMMARY

A mobile workload deployment mechanism in a cloud computing environment determines when mobile devices are in proximity of a resource needed to process a mobile workload, and deploys the mobile workload to the mobile devices in proximity of the needed resource. When a mobile device loses connection to the cloud, the mobile workload may be suspended on the mobile device or the mobile device can continue running the mobile workload in a disconnected state until connection to the cloud is reestablished. When a mobile device running a mobile workload is moving out of proximity of the needed resource, the mobile workload may be suspended or relocated to a different mobile device. In addition, the mobile workload deployment mechanism can require that all needed mobile devices are in proximity of a resource before a mobile workload is deployed to all the mobile devices, and may send a message to any of the needed mobile devices that are not in proximity of the resource to move into proximity of the resource. The mobile workload deployment mechanism may also detect when a mobile device running a mobile workload is moving away from a resource, and may send a message to the mobile device to stay in proximity of the resource. When a mobile device includes features that are disabled that prevent the mobile device from running a mobile workload, if the features may be remotely enabled, the mobile workload deployment mechanism remotely enables the needed features, then deploys the mobile workload to the mobile device. If the features may not be remotely enabled, the mobile workload deployment mechanism prompts the user of the mobile device to enabled the needed features. The mobile workload deployment mechanism thus deploys mobile workloads to mobile devices in a way that accounts for the mobility of the mobile devices.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

DETAILED DESCRIPTION

The claims and disclosure herein provide a mobile workload deployment mechanism in a cloud computing environment that determines when mobile devices are in proximity of a resource needed to process a mobile workload, and deploys the mobile workload to the mobile devices in proximity of the needed resource. Various methods performed by the mobile workload deployment mechanism account for the mobile nature of mobile devices, and how that mobility may affect the relocation, suspension, and other processing of the mobile workload.

Figure 1:
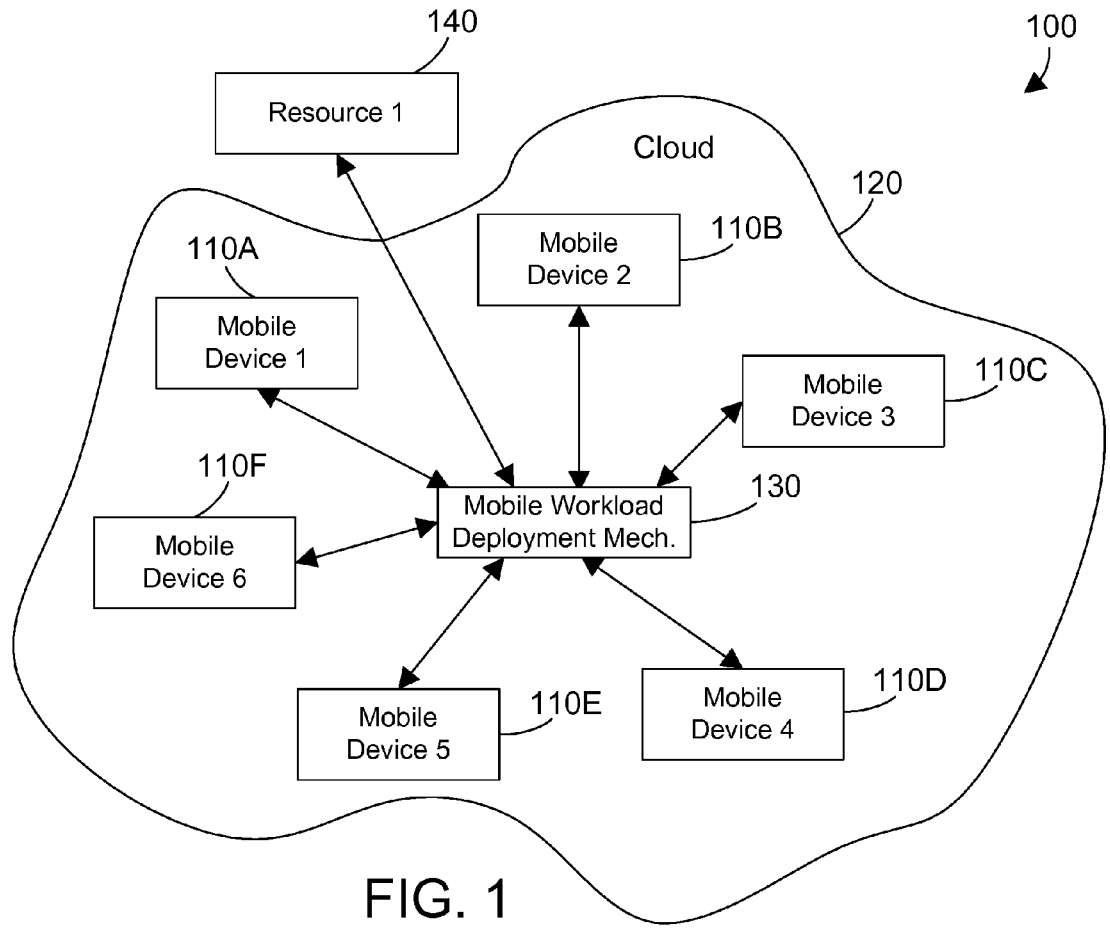
FIG. 1 is a block diagram of a sample cloud computing environment.

Referring to FIG. 1, a sample networked computer system 100 is one suitable implementation of a cloud computing environment that includes a mobile workload deployment mechanism 130. Networked computer system 100 includes six mobile devices 110A-110F coupled together via a cloud 120 in a cloud computing environment. A resource 140 communicates with the mobile workload deployment mechanism 130. The mobile workload deployment mechanism 130 deploys mobile workloads to the mobile devices 110A-110F that are in proximity of resource 140. The mobile workload deployment mechanism 130 may run on any suitable computer system or device coupled to cloud 120, including any stationary device or any mobile device. The term "proximity" as used in the disclosure and claims herein denotes a physical proximity between each mobile device and a resource needed to run the mobile workload. Several examples are provided below to illustrate the concept of "proximity." Note, however, these examples are for the purpose of illustration, and are not limiting. Proximity may include any suitable way to measure distance between a mobile device and a resource, including a linear unit of measure (e.g., meter), global positioning system (GPS) coordinates, strength of signal, natural or man-made boundaries (e.g., on a lake, within city limits, within a building), etc. Of course, other ways to measure or determine proximity are also within the scope of the disclosure and claims herein. In addition, while cloud 120 is shown in FIG. 1 to include only mobile devices, it is understood that cloud 120 could include any suitable computing device, both stationary and mobile.

Figure 2:
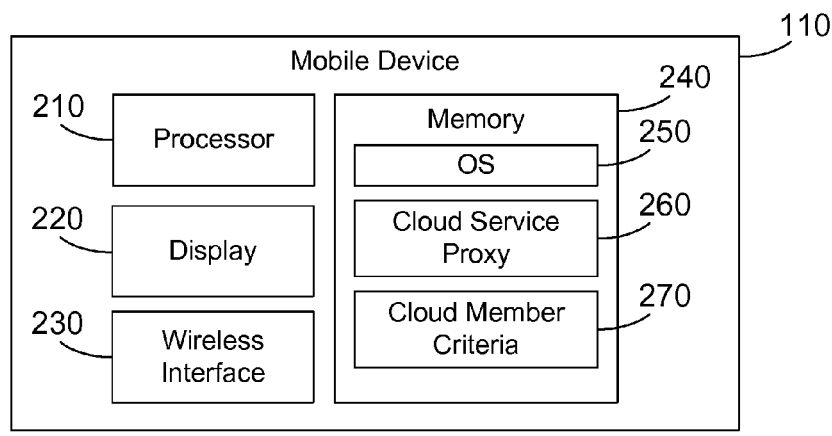
FIG. 2 is a block diagram showing features of the mobile devices in FIG. 1.

Each mobile device 110A-110F in FIG. 1 preferably includes components such as those shown in FIG. 2. Mobile device 110 includes a processor 210, a display 220, a wireless interface 230, and a memory 240. Processor 210 may be constructed from one or more microprocessors and/or integrated circuits. Processor 210 executes program instructions stored in memory 240. Display 220 includes any suitable display that displays information to a user. For example, display 220 could include a touch-sensitive color liquid crystal display (LCD), as is commonly used in tablet computers and smart phones. Wireless interface 230 includes any suitable interface that connects the mobile device 110 to the cloud 120, including a telephone interface (e.g., 3G, LTE, etc.) and a wireless Ethernet interface. Wireless interface 230 broadly represents any suitable way to interconnect electronic devices in a cloud computing environment, regardless of whether the environment includes present-day analog and/or digital techniques or some networking mechanism of the future. Wireless interface 230 preferably includes a combination of hardware and software that allow communicating with other devices in the cloud. Software in the wireless interface 230 preferably includes a communication manager that manages communication with other devices in the cloud using a suitable network protocol. Many different network protocols can be used. These protocols are specialized computer programs that allow computers to communicate across a network. TCP/IP (Transmission Control Protocol/Internet Protocol) is an example of a suitable network protocol that may be used by the wireless interface 230.

Memory 240 stores programs and data that processor 210 may access. When mobile device 110 starts up, processor 210 initially executes the program instructions that make up operating system 250 shown in memory 240. Mobile device 110 is representative of any suitable mobile computing device, including without limitations mobile phones (e.g., iPhone and Android), tablet computers (e.g., iPad), eBook readers (e.g., Nook and Kindle); roving consumer computers (e.g., iRobot mop or vacuum, automobiles, autonomic drones), and emergency devices (e.g., emergency medical technician (EMT) devices, and police mobile devices on the officer or in the squad car). The disclosure and claims herein extend to any suitable mobile device that has the ability to participate in a cloud computing environment, whether currently known or developed in the future.

Memory 240 preferably contains an operating system 250, a cloud service proxy 260, and cloud member criteria 270. Operating system 250 is a suitable mobile operating system, such as Android for mobile phones. Cloud service proxy 260 determines what happens when the mobile device 110 is executing a mobile workload and loses connection to the cloud as described in detail below with respect to FIG. 4. The cloud member criteria 270 specifies one or more criteria that describes the mobile device 110 so the mobile workload deployment mechanism 130 in FIG. 1 can determine whether or not the mobile device is a suitable candidate (or compute member) to which a mobile workload may be deployed. Cloud member criteria 270 may include, for example, a specification of hardware capabilities, operating system, software applications installed, etc. Cloud member criteria 270 may also include user-specified criteria that enables or limits deployment of mobile workloads based on conditions specified by the user. For example, if a user typically uses the mobile device heavily from the hours of 9:00-10:00 AM each day, the user could specify to disable deployment of mobile workloads to the mobile device during that hour each day. Any suitable criteria could be specified in the cloud member criteria 270 to aid the mobile workload deployment mechanism in determining whether or not to deploy a mobile workload to a mobile device.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language, Streams Processing language, or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The methods disclosed herein may be performed as part of providing a web-based service. Such a service could include, for example, offering the method to online users in exchange for payment.

Figure 3:
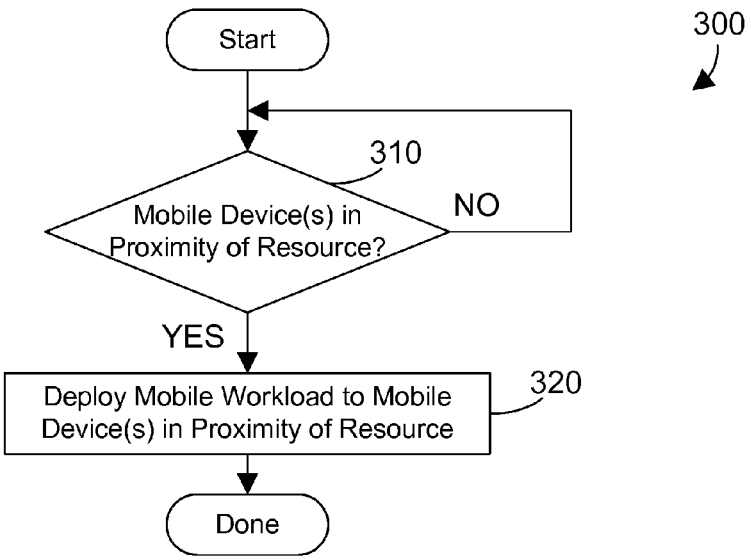
FIG. 3 is a flow diagram of a method for deploying a mobile workload to mobile devices based on proximity of the mobile devices to a resource.

Referring to FIG. 3, a method 300 is preferably performed by the mobile workload deployment mechanism 130 shown in FIG. 1. Method 300 determines if one or more mobile devices are in proximity of the resource (step 310). If not (step 310=NO), method 300 loops back to step 310 and waits until one or more mobile devices are in proximity of the resource (step 310=YES). The mobile workload is then deployed to mobile devices in proximity of the resource (step 320). A simple example will illustrate. Let's assume a large company provides smart phones for its many employees, on condition that the smart phones may be used by the company to process mobile workloads when the mobile phones are not being heavily used and when the smart phones are within proximity of the company's private network. Given the current processing capabilities of smart phones, and the increasing capabilities as time goes on, this company could perform substantial processing on the many smart phones that are not being heavily used during work hours, thereby decreasing its processing requirements on its central servers. In this example, the company's private network is the resource shown in FIG. 1, and mobile workloads are only deployed to mobile phones that are in proximity of the private network (i.e., that are close enough to access the company's private network).

Figure 4:
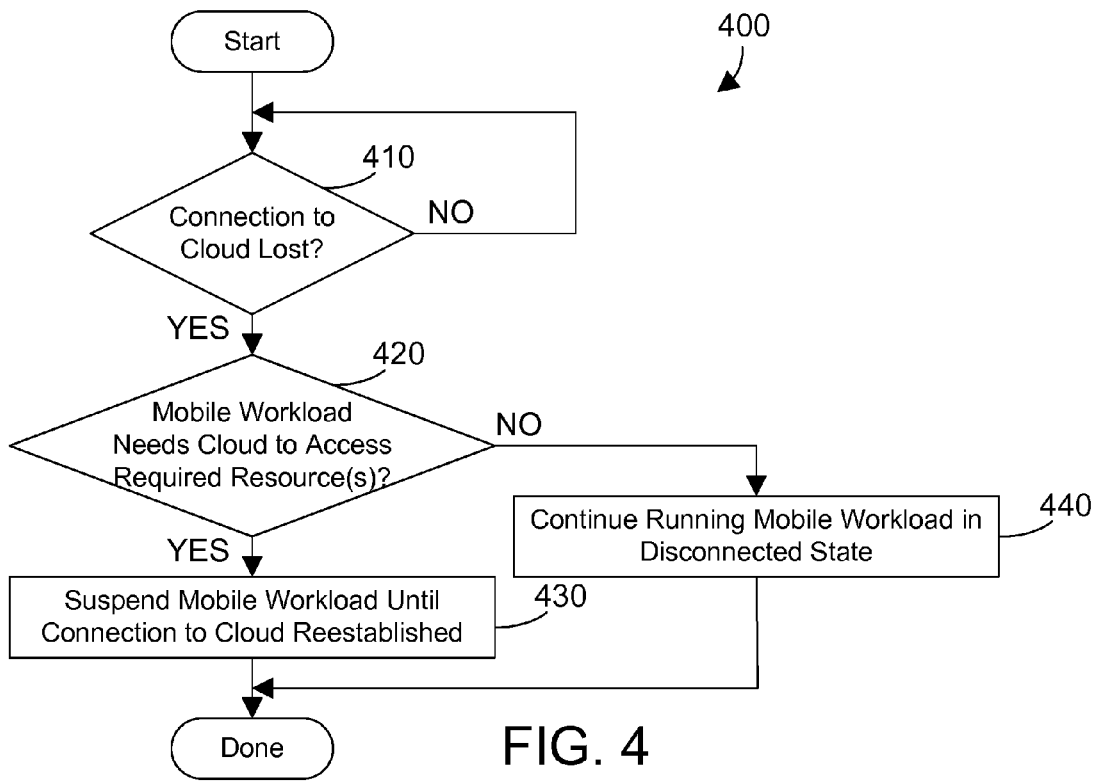
FIG. 4 is a flow diagram of a method for a mobile device when a connection to the cloud is lost while processing a mobile workload.

Referring to FIG. 4, a method 400 is preferably performed by the cloud service proxy 260 shown in FIG. 2. We assume a mobile device received a mobile workload to process. As long as the mobile device maintains connection to the cloud (step 410=NO), processing of the mobile workload continues. When the mobile device loses the connection to the cloud (step 410=YES), a determination is made whether the mobile workload needs the cloud to access the required resources (step 420). If so (step 420=YES), the mobile workload is suspended until the connection to the cloud is reestablished (step 430). If not (step 420=NO), the mobile device continues running the mobile workload in a disconnected state (step 440). Note the result of running the workload in the disconnected state will be returned to the mobile workload deployment mechanism as soon as the mobile device reestablishes its connection to the cloud.

Figure 5:
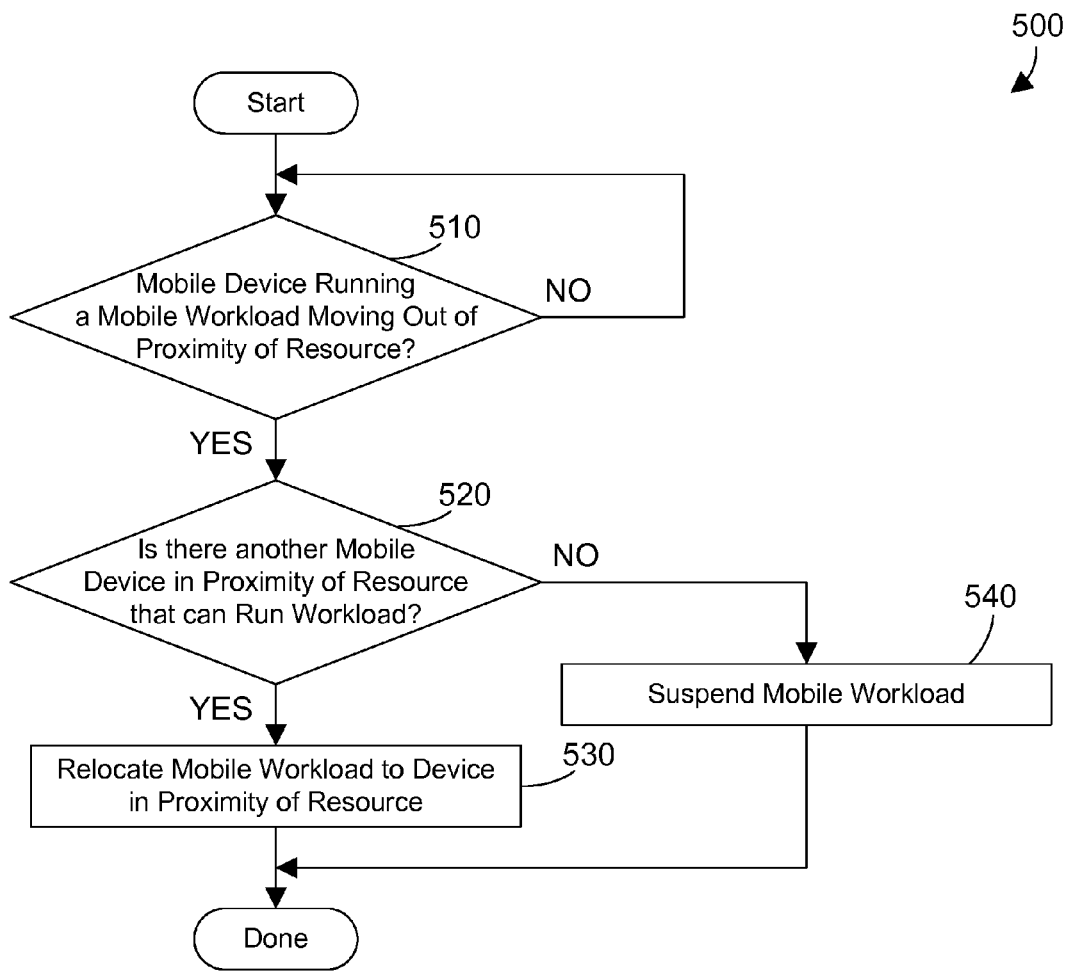
FIG. 5 is a flow diagram of a method for suspending or relocating a mobile workload when a mobile device is moving out of proximity of a resource.

Referring to FIG. 5, a method 500 is preferably performed by the mobile workload deployment mechanism 130 in FIG. 1. As long as the mobile device running a mobile workload is not moving out of proximity of the resource (step 510=NO), processing of the mobile workload continues. When the mobile workload deployment mechanism detects a mobile device running a mobile workload is moving out of proximity of the resource (step 510=YES), the mobile workload deployment mechanism determines if there is another mobile device in proximity of the resource that can run the workload (step 520). If so (step 520=YES), the mobile workload is relocated to a different device in proximity of the resource (step 530). If not (step 520=NO), the mobile workload is suspended (step 540). Note that suspending the mobile workload in step 540 could include pausing the processing of the workload until the mobile device is no longer moving out of proximity of the resource, at which point the mobile workload could be resumed. In the alternative, suspending the mobile workload in step 540 could include an abort command to the mobile device that is moving out of proximity of the resource, which causes the mobile device to stop processing the mobile workload and discard the mobile workload. The mobile workload may then be deployed later on a different mobile device that is in proximity of the resource. For example, let's assume that nurses in a hospital carry mobile devices that include air quality monitors. While in proximity of a hallway (resource), and all rooms on that hallway, the workload is deployed and air quality is sampled and reported. However, when a nurse walks beyond the hallway to another part of the hospital, the mobile workload is relocated to the mobile devices of other nurses still in proximity of the hallway.

Figure 6:
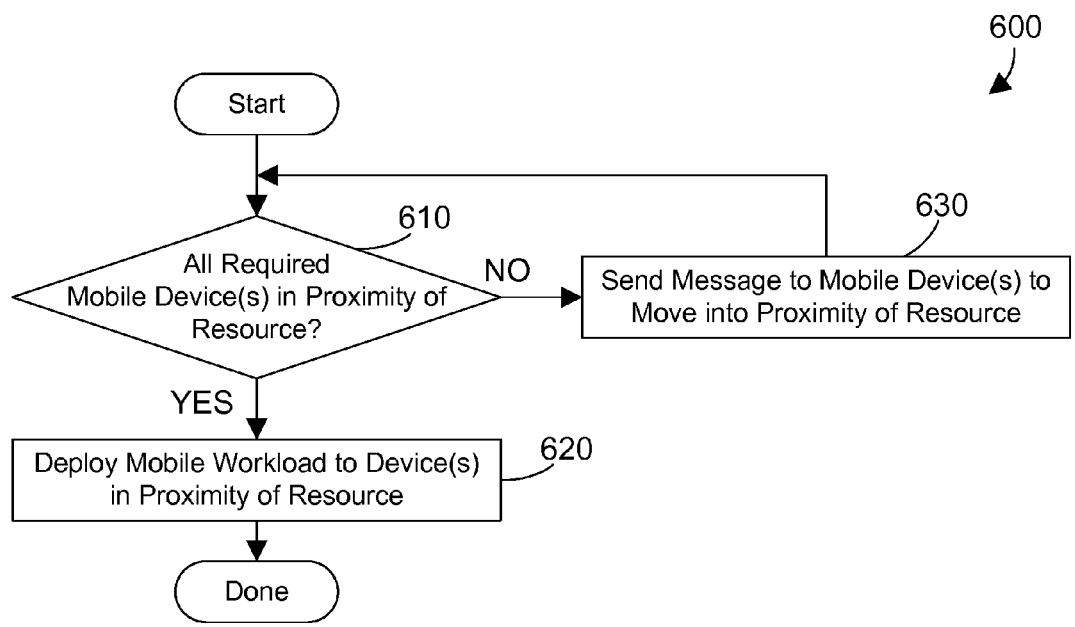
FIG. 6 is a flow diagram of a method for sending a message to a mobile device that is required to run a mobile workload to move into proximity of a resource.

Referring to FIG. 6, a method 600 is preferably performed by the mobile workload deployment mechanism 130 in FIG. 1. Method 600 is used when certain mobile devices must be in proximity of a resource before a mobile workload is deployed. If all required mobile devices are not in proximity of the resource (step 610=NO), a message is sent to the mobile device(s) that are not in proximity of the resource to move into proximity of the resource (step 630). Once all required mobile devices are in proximity of the resource (step 610=YES), the mobile workload is deployed to the mobile devices (step 620). A simple example will illustrate. Let's assume a team of firefighters has a staging area away from an area that has a fire. Let's further assume that six firefighters on the team are going to rendezvous at the staging position prior to fighting the fire, and the staging position includes a private network connection that allows downloading a mobile workload that causes automatic shifts in frequency of communications to assure the communications between members of the team are secure. Because all six team members must have the same mobile workload in order to communicate with each other, method 600 will detect whether all the required mobile devices are in proximity of the private network (step 610), and if not, messages are sent to those not in proximity of the private network to move to the staging area, which is the location in proximity of the private network. Once all six team members are in proximity of the private network, the mobile workload is deployed to the mobile devices for all six team members, which assures secure communications between team members. One of the unique features of method 600 is the ability to send messages in step 630 to mobile devices that are needed but are not yet in proximity of the resource. Essentially, a "hurry up" message tells a user of the mobile device that others are waiting for the arrival of the user in proximity of the resource.

Figure 7:
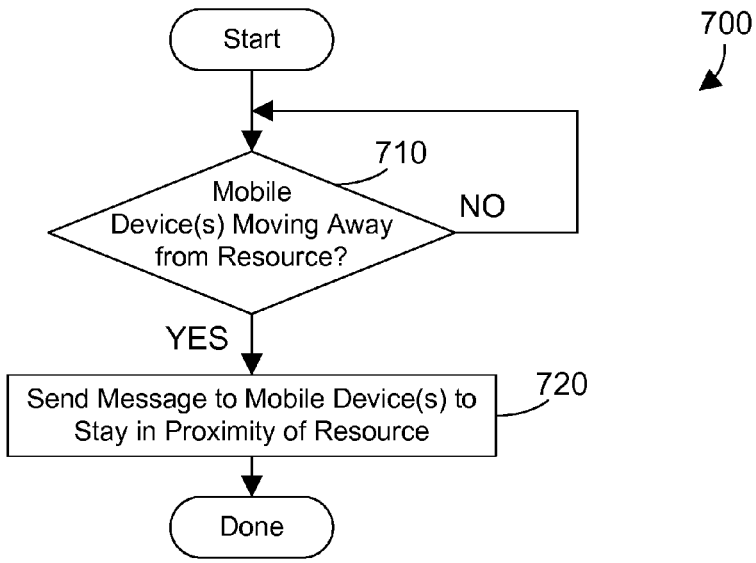
FIG. 7 is a flow diagram of a method for sending a message to a mobile device to stay in proximity of a resource.

Referring to FIG. 7, a method 700 is preferably performed by the mobile workload deployment mechanism 130 in FIG. 1. As long as the mobile devices are not moving away from the resource (step 710=NO), processing of the mobile workload continues. When method 700 detects one or more mobile devices are moving away from the resource (step 710=YES), a message is sent to the mobile device(s) to stay in proximity of the resource (step 720). Another example will illustrate. Let's assume a concert company offers a video and picture aggregating mobile workload for those attending a music concert, and if a user agrees to running the mobile workload, the user is granted free or low-cost access to the aggregated video and pictures from a large number of users. Let's further assume that due to the high data requirements of video streams and pictures, it takes some time for the mobile workload to upload all the video and pictures to the network at the concert venue. If a user who has a mobile device running the workload is leaving the concert before the mobile device has uploaded all the video and picture files, method 700 could send a message to the user asking the user not to leave the concert until the upload is complete. An estimated time required to complete the workload processing could be displayed to the user. Thus, if there remains two minutes of time to upload video and pictures to the network at the concert venue, the mobile workload could ask the user in step 720 not to leave the concert venue for approximately two minutes until the processing of the mobile workload is complete. Another message could also be sent telling the user when the processing of the mobile workload is complete. Method 700 thus involves the user by asking the user to stay in proximity of a resource until processing of the mobile workload is complete.

Figure 8:
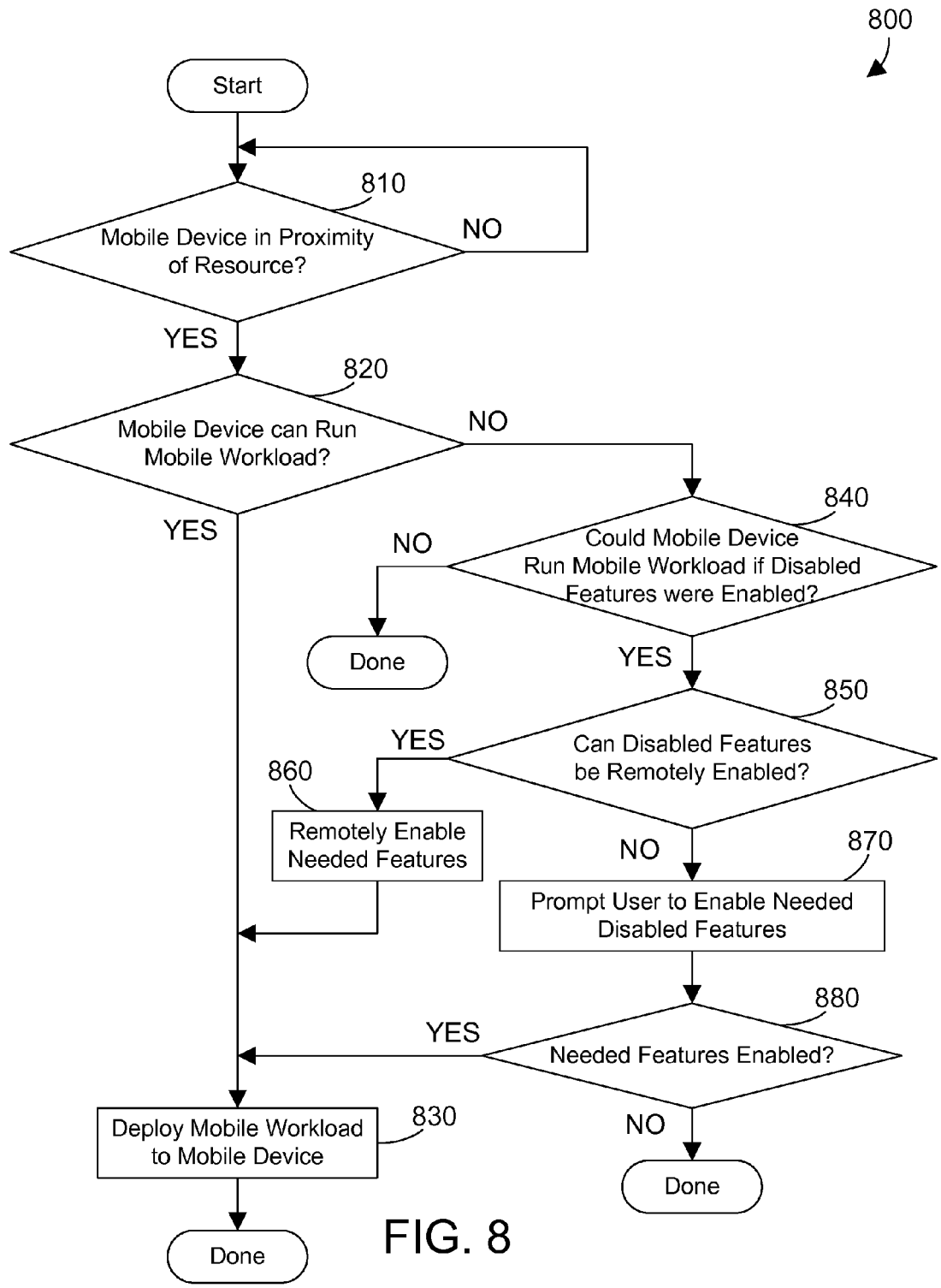
FIG. 8 is a flow diagram of a method for enabling features on a mobile device so the mobile device may be used to run a mobile workload.

Referring to FIG. 8, a method 800 is preferably performed by the mobile workload deployment mechanism 130 in FIG. 1. As long as no mobile device is in proximity of the resource (step 810=NO), method 800 loops back and waits until a mobile device in proximity of the resource is identified (step 810=YES). If the mobile device can run the mobile workload (step 820=YES), the mobile workload is deployed to the mobile device (step 830). In step 820, the cloud member criteria 270 shown in FIG. 2 for a mobile device could be read by the mobile workload deployment mechanism, and if the cloud member criteria 270 specifies that the mobile device can run the mobile workload (step 820=YES), the mobile workload is deployed to the mobile device (step 830). If the mobile device cannot run the mobile workload (step 820=NO), method 800 determines if the mobile device could run the mobile workload if disabled features on the mobile device were enabled (step 840). If not (step 840=NO), method 800 is done. If so (step 840=YES), if the disabled features needed to run the workload can be remotely enabled (step 850=YES), the needed features are remotely enabled (step 860), and the mobile workload is then deployed to the mobile device (step 830). If the disabled features on the mobile device cannot be remotely enabled (step 850=NO), the user is prompted to enable the needed features that are currently disabled (step 870). If the user enables the needed features (step 880=YES), the mobile workload may then be deployed to the mobile device (step 830). If the user does not enable the needed features (step 880=NO), method 800 is done. A simple example will illustrate. Let's assume a mobile device is in proximity of a resource, such as within range of a private network (step 810=YES), and a mobile workload requires GPS coordinates, but the GPS features on a mobile device are disabled (step 820=NO and step 840=YES). Assuming the GPS feature on the mobile device cannot be remotely enabled (step 850=NO), a message is sent to prompt the user to enable the GPS on the mobile device (step 870). If the user responds by enabling the GPS on the mobile device (step 880=YES), the mobile workload is deployed to the mobile device (step 830).

Other examples illustrate the function of the mobile workload deployment mechanism described herein. For example, a roving computer has access to a wireless network. The roving computer can execute a cleaning mobile workload to perform its main automated function. At the same time, a firmware update workload could be executed to download a firmware update from the wireless network. Let's assume the roving computer while executing its cleaning workload moves away from the wireless network switch, and the roving computer detects the wireless signal is getting weak. In response, the roving computer could suspend the cleaning workload and move itself back to where the wireless signal is strong to finish the firmware download before proceeding with the cleaning workload.

The disclosure and claims are directed to a mobile workload deployment mechanism in a cloud computing environment that determines when mobile devices are in proximity of a resource needed to process a mobile workload, and deploys the mobile workload to the mobile devices in proximity of the needed resource. Various methods performed by the mobile workload deployment mechanism account for the mobile nature of mobile devices, and how that mobility may affect the ability to process a mobile workload One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A networked computer system comprising:
a plurality of mobile devices coupled together in a cloud computing environment, each of the plurality of mobile devices comprising a processor and a memory; and
a mobile workload deployment mechanism executing on a computer system in the cloud computing environment, the mobile workload deployment mechanism determining distance of the plurality of mobile devices to a required resource needed to run a mobile workload, and deploying the mobile workload to at least one of the plurality of mobile devices based on distance of the at least one mobile device to the required resource;
wherein each of the plurality of mobile devices comprises a cloud service proxy mechanism that suspends the mobile workload when connection to the cloud computing environment is lost when the mobile workload needs the connection to the cloud computing environment to continue processing the mobile workload, and continues running the mobile workload in a disconnected state when the connection to the cloud computing environment is lost when the mobile workload does not need the connection to the cloud computing environment to continue processing the mobile workload.

2. The networked computer system of claim 1 wherein the mobile workload deployment mechanism detects when one of the plurality of mobile devices is moving out of range of the required resource, and when there is another mobile device in range of the required resource that can run the mobile workload, relocating the mobile workload to the another mobile device, and when there is not another mobile device in range of the required resource that can run the mobile workload, suspending the mobile workload.

3. The networked computer system of claim 1 wherein the mobile workload deployment mechanism specifies required mobile devices that all must be in range of the required resource before the mobile workload is deployed, and when at least one of the required mobile devices is not in range of the required resource, sending a message to move into range of the required resource.

4. The networked computer system of claim 1 wherein the mobile workload deployment mechanism detects when one of the plurality of mobile devices is moving away from the required resource, and in response, sends a message to the one mobile device to stay in range of the resource.

5. The networked computer system of claim 1 wherein the mobile workload deployment mechanism detects when one of the plurality of mobile devices could execute a mobile workload if at least one disabled feature were enabled, and when the at least one disabled feature may be remotely enabled, the mobile workload deployment mechanism remotely enables the at least one disabled feature, and when the at least one disabled feature may not be remotely enabled, the mobile workload deployment mechanism sends a message to the one mobile device prompting a user to enable the at least one disabled feature.

6. A computer-implemented method executed by at least one processor for deploying a mobile workload to a plurality of mobile devices in a cloud computing environment, the method comprising the steps of:
   determining distance of the plurality of mobile devices to a required resource needed to run a mobile workload; and
   deploying the mobile workload to at least one of the plurality of mobile devices based on distance of the at least one mobile device to the required resource;
   suspending the mobile workload when connection to the cloud computing environment is lost when the mobile workload needs the connection to the cloud computing environment to continue processing the mobile workload; and
   continuing running the mobile workload in a disconnected state when the connection to the cloud computing environment is lost when the mobile workload does not need the connection to the cloud computing environment to continue processing the mobile workload.

7. The method claim 6 further comprising the steps of:
   detecting when one of the plurality of mobile devices is moving out of range of the required resource;
   when there is another mobile device in range of the required resource that can run the mobile workload, relocating the mobile workload to the another mobile device; and
   when there is not another mobile device in range of the required resource that can run the mobile workload, suspending the mobile workload.

8. The method claim 6 further comprising the steps of:
   specifying required mobile devices that all must be in range of the required resource before the mobile workload is deployed; and
   when at least one of the required mobile devices is not in range of the required resource, sending a message to move into range of the required resource.

9. The method of claim 6 further comprising the steps of:
   detecting when one of the plurality of mobile devices is moving away from the required resource; and
   in response, sending a message to the one mobile device to stay in range of the resource.

10. The method of claim 6 further comprising the steps of:
    detecting when one of the plurality of mobile devices could execute the mobile workload if at least one disabled feature were enabled;
    when the at least one disabled feature may be remotely enabled, remotely enabling the at least one disabled feature; and
    when the at least one disabled feature may not be remotely enabled, sending a message to the one mobile device prompting a user to enable the at least one disabled feature.

11. A computer-implemented method executed by at least one processor for deploying a mobile workload to a plurality of mobile devices in a cloud computing environment, the method comprising the steps of:
    determining distance of the plurality of mobile devices to a required resource needed to run a mobile workload;
    deploying the mobile workload to at least one of the plurality of mobile devices based on distance of the at least one mobile device to the required resource;
    detecting when one of the plurality of mobile devices is moving out of range of the required resource;
    when there is another mobile device in range of the required resource that can run the mobile workload, relocating the mobile workload to the another mobile device;
    when there is not another mobile device in range of the required resource that can run the mobile workload, suspending the mobile workload;
    specifying required mobile devices that all must be in range of the required resource before the mobile workload is deployed;
    when at least one of the required mobile devices is not in range of the required resource, sending a message to move into range of the required resource;
    detecting when one of the plurality of mobile devices is moving away from the required resource;
    in response, sending a message to the one mobile device to stay in range of the resource;
    detecting when one of the plurality of mobile devices could execute the mobile workload if at least one disabled feature were enabled;
    when the at least one disabled feature may be remotely enabled, remotely enabling the at least one disabled feature; and
    when the at least one disabled feature may not be remotely enabled, sending a message to the one mobile device prompting a user to enable the at least one disabled feature.

12. An article of manufacture comprising software stored on a non-transitory computer readable storage medium, the software comprising:
    a mobile workload deployment mechanism for executing on a computer system in a cloud computing environment that includes a plurality of mobile devices, the mobile workload deployment mechanism determining distance of the plurality of mobile devices to a required resource needed to run a mobile workload, and deploying the mobile workload to at least one of the plurality of mobile devices based on distance of the at least one mobile device to the required resource, wherein each of the plurality of mobile devices comprises a cloud service proxy mechanism that suspends the mobile workload when connection to the cloud computing environment is lost when the mobile workload needs the connection to the cloud computing environment to continue processing the mobile workload, and continues running the mobile workload in a disconnected state when the connection to the cloud computing environment is lost when the mobile workload does not need the connection to the cloud computing environment to continue processing the mobile workload.

13. The article of manufacture of claim 12 wherein the mobile workload deployment mechanism detects when one of the plurality of mobile devices is moving out of range of the required resource, and when there is another mobile device in range of the required resource that can run the mobile workload, relocating the mobile workload to the another mobile device, and when there is not another mobile device in range of the required resource that can run the mobile workload, suspending the mobile workload.

14. The article of manufacture of claim 12 wherein the mobile workload deployment mechanism specifies required mobile devices that all must be in range of the required resource before the mobile workload is deployed, and when at least one of the required mobile devices is not in range of the required resource, sending a message to move into range of the required resource.

15. The article of manufacture of claim 12 wherein the mobile workload deployment mechanism detects when one of the plurality of mobile devices is moving away from the required resource, and in response, sends a message to the one mobile device to stay in range of the resource.

16. The article of manufacture of claim 12 wherein the mobile workload deployment mechanism detects when one of the plurality of mobile devices could execute a mobile workload if at least one disabled feature were enabled, and when the at least one disabled feature may be remotely enabled, the mobile workload deployment mechanism remotely enables the at least one disabled feature, and when the at least one disabled feature may not be remotely enabled, the mobile workload deployment mechanism sends a message to the one mobile device prompting a user to enable the at least one disabled feature.

* * * * *